(12) United States Patent
Viken (10) Patent No.: US 6,378,657 B2
(45) Date of Patent: *Apr. 30, 2002

(54) FLUID EXCHANGE SYSTEM

(76) Inventor: James P. Viken, 9890 Crestwood Ter., Eden Prairie, MN (US) 55347

( * ) Notice: Subject to any disclaimer, the term of this patent is extended or adjusted under 35 U.S.C. 154(b) by 0 days.

This patent is subject to a terminal disclaimer.

(21) Appl. No.: 09/757,960

(22) Filed: Jan. 10, 2001

Related U.S. Application Data (63) Continuation of application No. 08/772,836, filed on Dec. 24, 1996, which is a continuation of application No. 08/469,673, filed on Jun. 6, 1995, now abandoned, which is a continuation-in-part of application No. 08/209,061, filed on Mar. 9, 1994, now Pat. No. Re. 36,650, which is a continuation-in-part of application No. 07/781,322, filed on Oct. 23, 1991, now Pat. No. 5,318,080.

(51) Int. Cl.$^7$ ............................................. F16N 33/00
(52) U.S. Cl. ........................ 184/1.5; 184/106; 141/65; 141/98; 141/114
(58) Field of Search ................................. 220/571, 573; 141/65, 98, 114; 184/1.5, 104.3, 105.1, 106; 123/196 R (56) References Cited

U.S. PATENT DOCUMENTS

| | | |
|---|---|---|
| 1,630,899 A | 5/1927 | Lynch |
| 1,655,939 A | 1/1928 | Copeland |
| 1,815,221 A | 7/1931 | Sweetland |
| 1,829,173 A | 10/1931 | Wertz |
| 1,884,820 A | 10/1932 | Osborne |
| 2,320,048 A | 5/1943 | Parson |
| 2,499,705 A | 3/1950 | Vokes |
| 2,951,450 A | 9/1960 | Fisher |
| 3,033,311 A | 5/1962 | Edgar et al. |
| 3,140,756 A | 7/1964 | Dinkelkamp |
| 3,216,527 A | 11/1965 | Lewis |
| 3,223,291 A | 12/1965 | Thomas |
| 3,370,759 A | 2/1968 | Johansson |
| 3,447,636 A | 6/1969 | Bonfilio |
| 3,513,941 A | 5/1970 | Becnel |
| 3,565,287 A | 2/1971 | Johnston |
| 3,720,287 A | 3/1973 | Martel |
| 3,867,999 A | 2/1975 | Cox |
| 4,095,672 A | 6/1978 | Senese |
| 4,095,673 A | 6/1978 | Takeuchi |
| 4,114,644 A | 9/1978 | Piper |
| 4,127,160 A | 11/1978 | Joffe |
| 4,128,140 A | 12/1978 | Riches |
| 4,193,487 A | 3/1980 | Takeuchi |
| 4,331,185 A | 5/1982 | Rinaldo et al. |
| 4,438,872 A | 3/1984 | Dooley et al. |

(List continued on next page.)

FOREIGN PATENT DOCUMENTS

| | | | |
|---|---|---|---|
| CA | 675835 | 12/1963 | |
| JP | 55-107189 A | * 8/1980 | ................. 184/106 |
| JP | 72299 | 3/1990 | |

OTHER PUBLICATIONS

Translation of JP 2-72299, Dated Nov. 7, 1997.
Translation of JP 62-22718, Dated Nov. 14, 1997.

Primary Examiner—Christopher Verdier
(74) Attorney, Agent, or Firm—Fulbright & Jaworski L.L.P.

(57) ABSTRACT

Fluid changing in an automatic transmission by opening the cooler line and draining used fluid, at the flow of normal circulation, out of the cooler line from the transmission into a drain receptacle for receiving used fluid and simultaneously supplying fresh fluid, from a pressurized supply receptacle into the cooler return line to the transmission at a similar controlled rate that is equal or greater than the rate of flow of the used fluid into the drain receptacle.

5 Claims, 7 Drawing Sheets

U.S. PATENT DOCUMENTS

| | | |
|---|---|---|
| 4,674,456 A | 6/1987 | Merritt |
| 4,745,989 A | 5/1988 | DiMatteo |
| 4,784,170 A | 11/1988 | Romanelli et al. |
| 4,787,348 A | 11/1988 | Taylor |
| 4,807,674 A | 2/1989 | Sweet |
| 4,869,346 A | 9/1989 | Nelson |
| 4,877,043 A | 10/1989 | Carmichael et al. |
| 4,909,207 A | 3/1990 | Takano et al. |
| 4,938,315 A | 7/1990 | Ohta et al. |
| 4,951,784 A | 8/1990 | Bedi |
| 4,958,666 A | 9/1990 | Kocourek |
| 4,976,235 A | 12/1990 | Commanday |
| 5,015,301 A | 5/1991 | Baylor et al. |
| 5,056,621 A | 10/1991 | Trevino |
| 5,062,500 A | 11/1991 | Miller et al. |
| 5,088,529 A | 2/1992 | Jones et al. |
| 5,092,429 A | 3/1992 | Linares et al. |
| 5,148,785 A | 9/1992 | Sendak |
| 5,190,120 A | 3/1993 | Watts |
| 5,289,837 A | 3/1994 | Betancourt |
| 5,291,968 A | 3/1994 | Brown |
| 5,318,080 A * | 6/1994 | Viken .......................... 141/98 |
| 5,337,708 A | 8/1994 | Chen |
| 5,361,870 A | 11/1994 | Courcy |
| 5,370,160 A | 12/1994 | Parker |
| 5,372,219 A | 12/1994 | Peralta |
| 5,415,247 A | 5/1995 | Knorr |
| 5,427,202 A | 6/1995 | Behring et al. |
| 5,447,184 A | 9/1995 | Betancourt |
| 5,472,064 A * | 12/1995 | Viken .......................... 184/1.5 |
| 5,495,916 A | 3/1996 | DiMatteo |
| 5,522,474 A | 6/1996 | Burman |
| 5,546,999 A | 8/1996 | Parker |
| 5,555,919 A | 9/1996 | Lipp |
| RE36,650 E * | 4/2000 | Viken .......................... 184/1.5 |

* cited by examiner

FLUID EXCHANGE SYSTEM

CROSS REFERENCE TO RELATED APPLICATIONS

This application is a continuation to pending U.S. patent application Ser. No. 08/772,836, filed Dec. 24, 1996, which was a Continuation of U.S. patent application Ser. No. 08/469,673, filed Jun. 6, 1995 (abandoned), which was a Continuation-In-Part of U.S. patent application Ser. No. 08/209,061, filed Mar. 9, 1994, now RE36,650, which was a Continuation-In-Part of U.S. patent application Ser. No. 07/781,322, filed Oct. 23, 1991, now U.S. Pat. No. 5,318,080, each reference incorporated by reference herein.

FIELD OF THE INVENTION

This invention relates generally to automatic transmission fluid exchange systems and is more particularly directed to system and method of use for replacing the fluid in automatic transmissions having sealed, or inaccessible hydraulic torque converters and which include a fluid circulating pump and inlet and outlet ports for circulation of the hydraulic transmission fluid to fluid coolers and the like.

DESCRIPTION OF THE INVENTION

The following is a list of prior art encountered in the course of a search of the prior art with which my invention is concerned.

| U.S. Pat. No. | Title | Issued Date | Inventor |
|---|---|---|---|
| 1,829,173 | COMBINED FLUSHER AND LUBRICANT DISPENSER | | A. L. Wirtz |
| 1,884,820 | METHOD OF CLEANING LUBRICANT CONTAINERS | Oct. 25, 1932 | W. L. Osborne |
| 3,216,527 | APPARATUS FOR CHANGING CRANKCASE OIL | Nov. 9, 1965 | O. G. Lewis |
| 3,447,636 | AUTOMATIC OIL EXCHANGING SYSTEM | June 3, 1969 | R. J. Bonfilio |
| 3,513,941 | FLUID CHANGE MEANS FOR AUTOMATIC TRANSMISSIONS | May 26, 1970 | N. J. Becnel |
| 4,095,672 | APPARATUS FOR REMOVAL OF LUBRICATING COMPOSITION AND METHODS FOR USING SAME | Jun. 20, 1978 | F. J. Senese |
| 4,331,185 | TRANSMISSION FILLER ASSEMBLY | May 25, 1982 | J. D. Rinaldo et al. |
| 4,745,989 | VALVE FOR DRAINING AUTOMATIC TRANSMISSION FLUID AND METHOD OF USING SAME | May 24, 1988 | J. G. DiMatteo |

Of the above references, some of which pertain to other activities involving the addition or removal of fluid from various and sundry mechanisms, the Becnel U.S. Pat. No. 3,513,941 for FLUID CHANGE MEANS FOR AUTOMATIC TRANSMISSIONS and the DiMatteo U.S. Pat. No. 4,745,989 for VALVE FOR DRAINING AUTOMATIC TRANSMISSION FLUID AND METHOD OF USING SAME are believed to be the most directly pertinent to my invention. In Becnel and DiMatteo, a method and apparatus are described for draining and refilling the fluid in a motor vehicle automatic transmission. The similarities between Becnel and DiMatteo are almost surprising in that each of them provides a cooler outlet and some arrangement for adding fluid to the transmission either through the filler port or to a return line from the transmission fluid cooler. When a transmission cooler line is opened and drained with no restriction the rate of flow at which the fluid is exhausted rapidly increases and fluid is pumped out of the transmission and torque converter much faster than it can be replaced by being pumped in the return line as specified in Becnel's invention, resulting in a disruption of the usual internal and external fluid flow rates and flow patterns which occur normally; this disruption includes an intermittent, recurrent starvation condition to certain internal transmission components resulting in undue stress and frequent damage to those components. Becnel's invention appears to have the capability to supply fresh fluid into the transmission through the return line from the cooler back to the transmission at a predetermined, pre-selected flow rate, but his invention allowed no clear means of balancing and/or matching that flow rate to the rate at which fluid is normally circulated through the cooler line back to the transmission or regulating the exhausting of aged fluid into the waste receptacle to produce a balanced substitution of fresh fluid for aged fluid.

Exhausting aged fluid through an open, unrestricted transmission cooler line results in a flow rate to and out of that opening which is far in excess of the rate at which fluid is normally circulated through the cooler, because the usual and significant flow resistance provided by the return line to the transmission itself and the internal down-line components has been eliminated by interrupting/opening the transmission cooler line.

DiMatteo's invention specifies an unrestricted exhausting of aged fluid through an open cooler line as Becnel's does and also results in a great increase in rate of flow of fluid through the line leading from the transmission to the cooler line at the point it is exhausted, much greater than normally occurring with a closed cooler line in normal closed-loop circulation. Not only does this result in emptying of the transmission pan and starvation of the internal pump(s) and torque converter as well as other internal components, but Dimatteo's invention does not specify any pumping of fresh fluid in the return line to the transmission thus, completely disrupting internal and external flow rates and flow patterns and resulting in complete lack of lubrication to the bearings and internal parts of the transmission which receive fluid from the line returning from the cooler to the transmission. DiMatteo specifies adding fresh fluid as the aged fluid when drained out of the open, unrestricted transmission cooler line, by manually pouring it through the filler tube with a poorly metered, poorly controlled method not balanced to rate of exhaust flow.

In the course of arriving at the method and apparatus of my invention, the concepts present in Becnel and DiMatteo were utilized in a similar manner and it was discovered that most, if not all, of the transmissions operated upon became excessively hot or were subject to internal damage to the fluid seals, rear bearings, or other internal components because it was impossible to maintain equality between the fluid added and the fluid drained, because it was impossible to maintain normal fluid flow rates and flow patterns external to and internal within the transmission and its component parts. In other words, what is lacking in Becnel or DiMatteo is a realistic, functional, reliable means or a method for maintaining a balance to provide a dynamic equality of fluid added and fluid removed by replacing aged fluid with fresh fluid through an opened transmission cooler line without disrupting normal internal and external flow rates and flow distribution patterns.

It may be noted that in the event fluid is allowed to drain faster than the rate of addition of fluid, the pump or torque converter in a transmission is likely to be starved and then will become excessively hot under which conditions a transmission will self-destruct if permitted to continue in operation. On the other hand, should excessive fluid be added to build up an internal pressure within the transmission, there is a strong likelihood that seals for shafts and/or valves, bearings, or the like or other internal components, within the transmission, may be irreparably damaged with a resulting failure of the transmission under subsequent operating conditions.

The remainder of the patents are understood to be directed to various and sundry arrangements for adding, removing and changing fluid which are believed to be more remotely related to the concepts of my invention as will be explained in more detail below.

SUMMARY OF THE INVENTION

Briefly, my invention is comprised of a fluid receiver for used fluid, a source of supply of fresh fluid, and a means for coordinating the introduction of fresh fluid with the draining of used fluid. With this in mind, it then only remains necessary to separate the fluid flow in a line that is external from the transmission so that the used fluid is drained into a suitable fluid container and the new fluid is introduced at the same rate that the used fluid exits. This can be accomplished in a number of ways, some of which will be described in more detail below.

In one embodiment of my invention, a tank having one port at each end is divided into two chambers by a flexible diaphragm. The tank is filled with fresh fluid through one port which may be known as the supply port and the diaphragm is distended so that substantially the entire tank may be filled with fresh fluid. The supply port, is then connected to the return line of a transmission, the fluid of which is to be renewed. The other port is connected to a drain or exhaust line and the transmission is rendered operative and under these conditions, fluid will be driven from the transmission to the drain line through the drain port of the tank to exert a pressure therein on the diaphragm which will then cause the supply of fresh fluid to flow into the return line and thence back into the transmission. It may now be abundantly clear that the fluid removed is exactly equal to the fluid added so that the transmission will be completely filled with fluid without any excessive pressure drops across sealed shafts or valves and will remain operative in its normal manner with the usual flow rates and flow distribution patterns external to and internally within the transmission and its component parts.

In a typical replacing operation, the fluid drained may be visually observed until the appearance or color assumes that of fresh fluid and the operator will then know that the fluid within the transmission consists essentially, entirely of fresh fluid having the required lubricating and additive properties.

Typically, an amount of fresh fluid in excess of the fluid capacity of a transmission is necessary because of the dilution factor which may vary from transmission to transmission but which is always present. This may vary from 25 to 75 percent of the capacity of a transmission.

In another embodiment of my invention, a pneumatic cushion is provided intermediate individual receptacles for receiving used fluid and adding new fluid while pressure within the receptacles is maintained at a predetermined level commensurate with the normal operating pressure of the fluid in a given transmission.

In a further embodiment of my invention, the apparatus for draining used fluid is provided with a suitable restriction for permitting or controlling the discharge of used fluid so as to maintain, in effect, a back pressure on the circulation pump in a transmission so that the fluid removed by the draining procedure does not exceed the internal source of supply for the pump, which is being replaced at a level consistent with the volume of fluid that is drained. The fresh, clean fluid that is returned to the transmission is then supplied at a rate which is equal to or greater than the volume of expended, dirty fluid that is drained at a controlled rate. A controller, such as is described in one of the illustrated embodiments may be utilized for this purpose.

In another embodiment, an apparatus according to the present invention utilizes an external pump to assist in the extraction of fluid from an access automatic transmission circuit. In another embodiment, an external pumping system introduces for fresh fluid is quite novel when compared to all other prior art since it is bifurcated into two separate but coordinated sources of introducing fresh fluid into the transmission. These two separate but coordinated supply sources can be used to introduce fresh fluid into the transmission at two separate loci at any overall rate needed to match the unrestricted or enhanced exhausting of used fluid specified in the second preferred embodiment.

The invention introduces fresh fluid into the transmission through the cooling return line and this is used in both of its two embodiments during both the static part of the complete fluid exchange and during the dynamic part as well. The invention introduces fresh fluid directly into the transmission pan through the dipstick/filler tube by means of the pan access tube during the static part of the complete fluid exchange in the second embodiment, and during the dynamic part of the complete fluid exchange in the second embodiment. The fresh fluid introduced into the transmission from both sources is metered together, that is, measured additively, and both are suitably regulated individually and together by utilizing a variable flow regulator valve and an adjustable relief valve used as a distribution proportioning valve. Of course many other equivalent means can be used without departing from the art.

In order to maintain overall balance between the rate at which used fluid is extracted and the rate at which fresh fluid is introduced during the dynamic part of the complete fluid exchange, fresh fluid must enter the transmission just as fast as the used fluid flows out of the opened cooling line which has had additional low pressure applied to its cooling outlet side in the second, preferred embodiment.

Lack of inclusion of additional illustrations of embodiments clearly related to and based on this novel art, should not be construed as suggesting that they are not a part of the novel art of this invention.

This invention provides a complete fluid exchange for automatic transmissions consisting, of: 1) the utilization and coordination of a static fluid change which includes flushing, purging, cleaning of the pan and the cooling return line and its downstream circuits; and 2) a dynamic fluid exchange which includes the flushing, purging, cleaning of the remaining inaccessible components such as the torque converter and other internal components which are only accessible with the use of this type of apparatus with the transmission operating.

This invention institutes this complete fluid exchange in as short a period of time as feasible with the least amount of fluid utilized that is practical.

This invention provides the means to unequivocally replace the used fluid extracted during both the static and dynamic phases of the complete fluid exchange in a coordinated, systematically controlled manner.

This invention provides the coordinated means to refill an automatic transmission in as short a time as feasible using the minimum amount of fresh fluid practical without creating any fluid starvation or other potentially harmful conditions in the transmission or vehicle during the dynamic part of the complete fluid exchange.

Because the complete fluid exchange system utilizes enigmatic, unobvious and novel art to attain these utilitarian and commercially useful results, it is therefore distinctly patentable. Each of the two embodiments of the invention specified in FIGS. 8 and 9 incorporate the use of a unique pan access tube, which serves as a used fluid extraction means in both embodiments during the static phase of the complete fluid exchange. It also serves with a second, dual use as an additional, coordinated means of fresh fluid introduction at a second locus during the dynamic phase of the complete fluid exchange in the second preferred embodiment.

The invention provides an apparatus comprised of but not limited to: a source of fresh fluid and means to apply pressure to introduce that fresh fluid into the transmission at more than one locus; a reservoir to receive used fluid extracted from the transmission at more than one locus; a means to apply low pressure to these extraction loci such that used fluid is extracted from them; a means to measure and balance the flow rate and volume of fresh fluid introduced into the transmission and during the dynamic part of the fluid exchange the flow rate and volume of used fluid extracted from the transmission such that fresh fluid is simultaneously exchanged with used fluid at the same approximate rate without causing any starvation conditions or other potentially harmful conditions in any internal transmission component during the dynamic part of the complete fluid exchange when the transmission is running, or during the static part of the complete fluid exchange before the dynamic part of the exchange is instituted.

In summary, the invention has the capability to institute a complete exchange of fresh fluid for used fluid in the shortest time practical using the minimum amount of fresh fluid. It also has the capability of maintaining a balanced rate of flow between the fresh fluid being introduced and the used fluid being extracted. It has the capability to institute virtually a complete flushing and purging of used fluid with an essentially complete cleaning of the transmission. It also provides the operator with an easy to operate apparatus which can be used conveniently to attain the desired results which the complete fluid exchange offers. These novel contributions to the art of changing fluid in automatic transmissions make the invention commercially useful and patentable.

Further objects and advantages of my invention will become apparent from a consideration of the drawings and ensuing description of each.

DESCRIPTION OF THE ILLUSTRATED EMBODIMENTS

Figure 1:
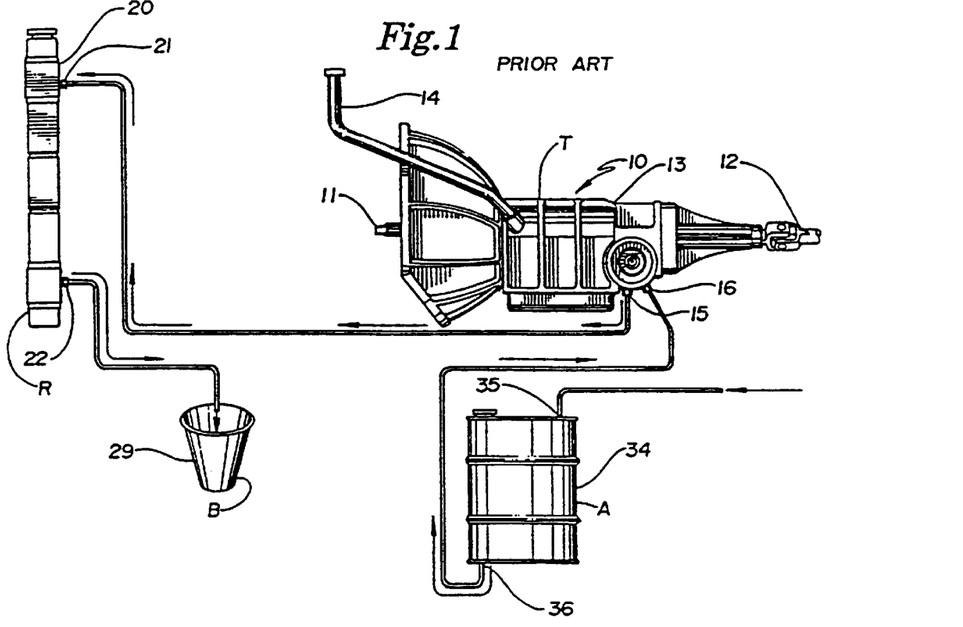
FIGS. 1 and 2 are sketches of prior art devices as described above.
Figure 2:
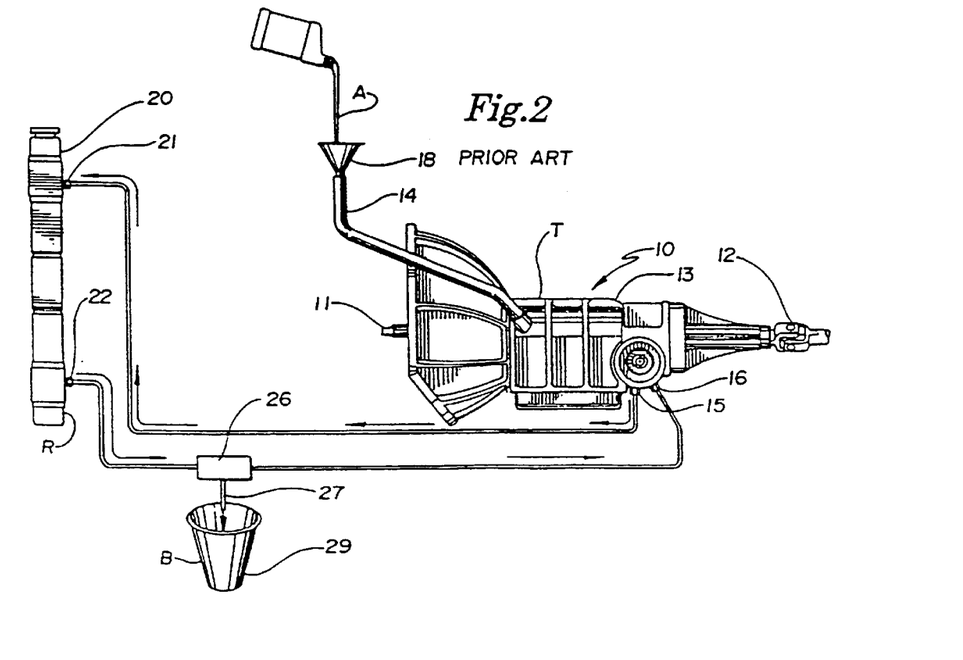

Referring to FIGS. 1 and 2 of the drawings two illustrations of the prior art are used in connection with a typical automatic transmission 10 having a case 13 and a fluid filler tube 14, a fluid outlet 15, and a fluid inlet 16, and an input shaft 11, and output shaft 12. The fluid outlet and inlets for the transmission are typically utilized to circulate fluid under pressure from within transmission 10 to a means for extracting excess heat from the transmission fluid used in the operation of the transmission. This is typically done by a section of an automotive radiator having an inlet 21 and an outlet 22. Inlet 21 is directly connected to fluid outlet 15 on transmission 10 through a suitable tubular member. In FIG. 1, outlet 22 is permitted to drain unrestricted and unregulated into a bucket 29 for receiving used transmission fluid. A tank 34 comprises a source of fresh transmission fluid, also indicated by reference character A and includes an outlet 36 that is connected to inlet 16 on transmission 10 through a suitable tubular member and a pressure inlet 35 that is connected to a suitable source under pressure (not shown).

In FIG. 2, a valve 26 is shown connected to outlet 22 on radiator 20 and is operable to direct the flow of fluid to an outlet 27 which exhausts used fluid unrestricted and unregulated into bucket 29 or to another outlet which is connected to inlet 16 on transmission 10 through a suitable tube.

Further, in the prior art of FIG. 2, a source of fluid is shown comprised of a funnel 18 (also indicated as a fresh fluid source A) which is inserted into the top of filler tube 14 on transmission 10 for the addition of fluid thereto. The top of funnel 18 is supplied with fluid from a suitable container, such as the bottle shown.

Figure 3:
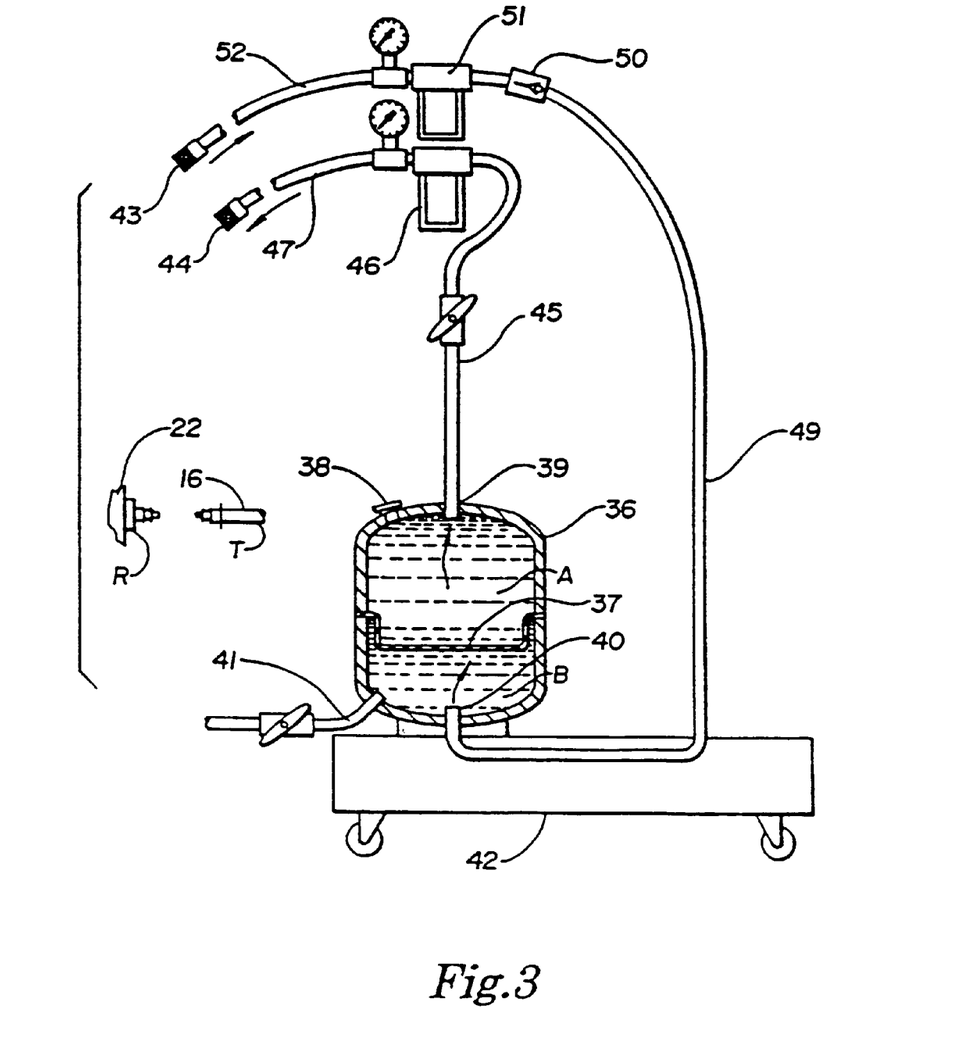
FIG. 3 is a side elevational view, partly in section, illustrating my invention.

In the embodiment of FIG. 3, a tank 36, having a flexible, rubber-like diaphragm 37, a top filler tube 38 and an outlet port 39 at the top end an inlet port 40 and a drain port 41 at the lower end is disposed in a generally-vertically oriented attitude on top of a wheeled cart 42. A fluid supply tube 45, including an on-off valve is shown disposed intermediate outlet port 39 and a sight glass 46 that is, in turn, connected to a further supply tube 47 having a quick connect mechanism 44 for connection to a radiator port 22 or a transmission port 16, each adopted to connect with connector 44. A drain tube 49 is shown connected to inlet port 40 on the lower end of tank 36 and includes a check valve 50 which is, in turn, connected to another sight glass 51 which is connected to a further drain tube 52 having a connector 43 at its end and adapted for connection to port 22 on radiator 20 or port 16 on transmission 10. Check valve 50 is oriented to permit the flow of used fluid through drain tube 52, sight glass 51, check valve 50, and drain tube 49 to inlet port 40 on the lower end of tank 36. The upper portion of tank 36 is designated as a fresh supply tank A and the lower portion is designated as a used fluid receiver B.

Figure 4:
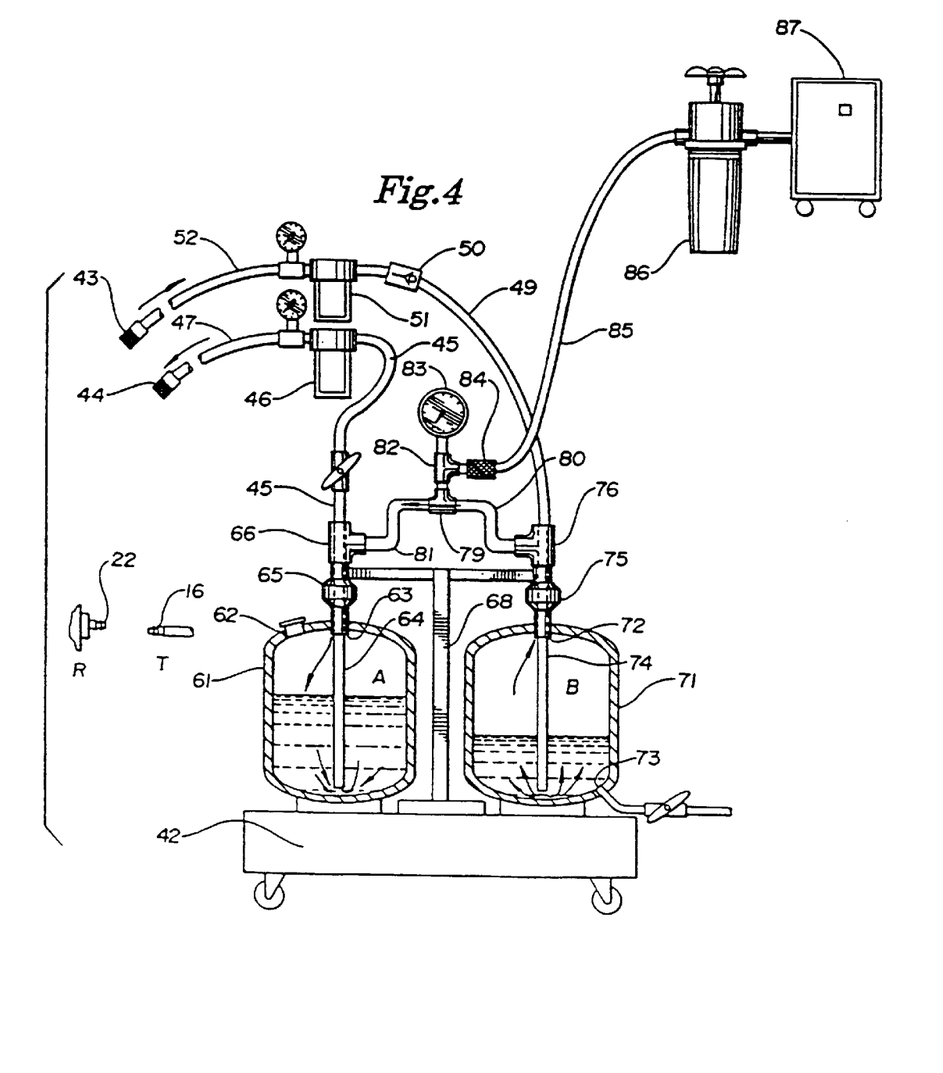
FIG. 4 is a side elevational view, partly in section, illustrating a further embodiment of my invention.

In FIG. 4, a fresh fluid tank 61 and a used fluid tank 71 are shown mounted upon cart 42 and are connectable, respectively, to ports 22 or 16 on radiator 20 and transmission 10, depending upon the direction of fluid flow in the line from transmission 10 through inlet port 16 to outlet port 22 on radiator 20.

Tank 61 includes a filler tube 62 and an outlet 63 disposed at the top end. A fresh fluid supply tube 64 extends downwardly into tank 61 to a point near its bottom and tank 61 has been designated with the reference character A to indicate it is a source of fresh, clean transmission fluid. The top of tank 61 is connected to a quick release mechanism 65 which is, in turn, connected to the lower end of a shrouded pass through T 66 and it may be seen that tube 64 extends upwardly to supply tube 45 through the interior of shrouded T 66 and the interior of shrouded T 66 is in fluid communication with the upper end of tank 61.

Tank 71 is provided with an inlet port 72 at its upper end and a drain port 73 at its lower end. A drain tube 74 extends downwardly into tank 71 although it need not extend for any particular distance. A quick connect mechanism 75 is connected to the upper end of inlet port 72 and to the lower end of shrouded and pass through T 76. The upper end of tube 74 extends upwardly to connection with drain tube 49. A T 79 is shown between the side outlets on shrouded Ts 66 and 76 through tubes 80 and 81. The upper end of T 79 is connected to a further T 82 which has a gauge 83 disposed at one outlet and a Schrader valve 84 connectable to an air hose 85 which is connected to the output of an air regulator 86 connected to a source of air under pressure 87. Tanks 61 and 71 are supported through a bracket means 68, the entire assemblage being suitably disposed upon the top of wheeled cart 42.

Figure 5:
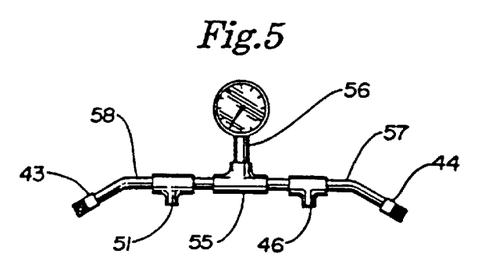
FIG. 5 is an accessory which may be utilized in practicing my invention.

FIG. 5 illustrates a means of determining the pressure existing intermediate outlet port on radiator 20 and inlet port 16 on transmission 10 and includes a T 55 that are connected to quick connectors 43 and 44 and sight glasses 46 and 51 through tubes 58 and 57 respectively. A suitable outer gauge 56 is shown connected to the other port on T 55.

Figure 6:
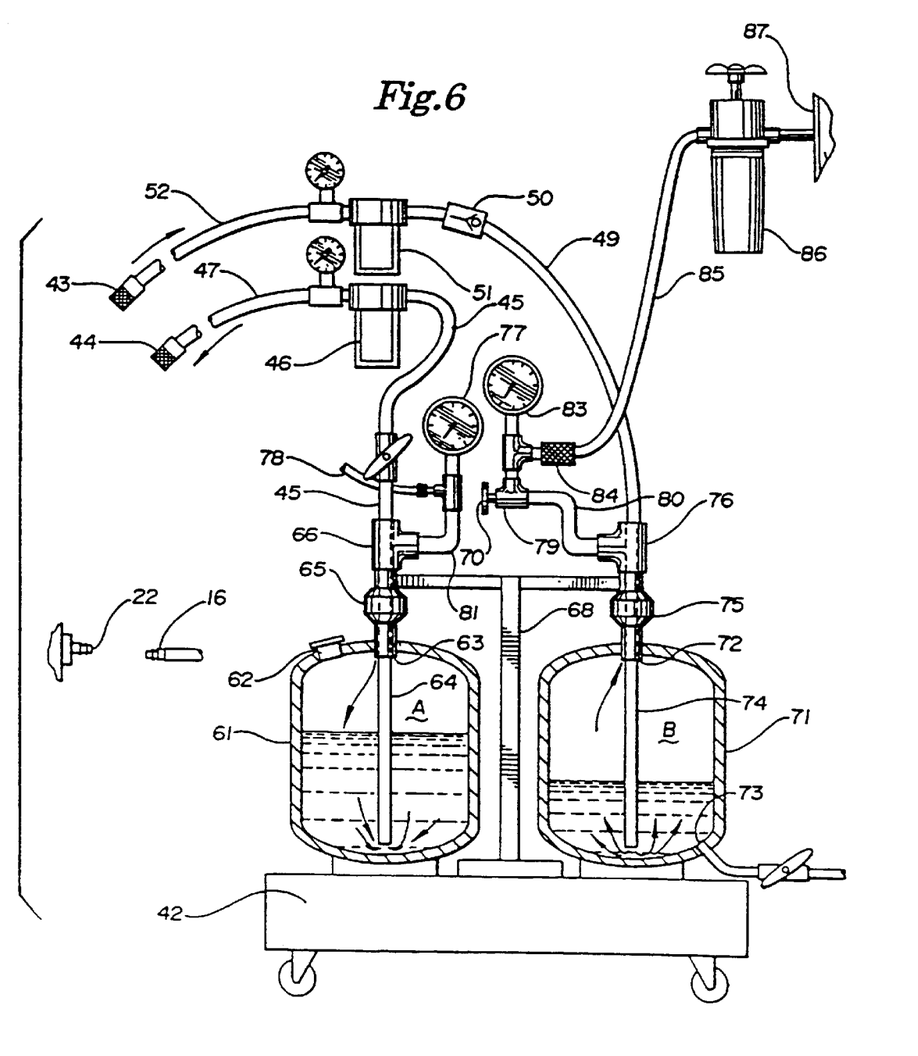
FIG. 6 is an enlarged side elevational view, party in section, illustrating a still further embodiment of my invention.

It may now be appreciated that the expended, dirty fluid is drained as substantially the same rate as clean, fresh fluid is added. It is anticipated that substantially the same results may be obtained by, for example, replacing shrouded Ts 66 and 76 with appropriate flow controllers, the operation of which may be synchronized. In any event, the limiting of the flow of the used fluid to a drain waste receiver is typically limited to establishing and retaining a back pressure of substantially the internal pump pressure of the transmission undergoing a fluid replacing operation. In the embodiment of FIG. 6, tank 61 is connected to a source of air under pressure through a regulator 86, the output of which is connected to tube 78 (not shown) which is, in turn, connected to gauge 77 and to tube 81, through shrouded T 66 and quick connect 65 to the top of tank 61. Tank 71 is left connected to the regulated source of air under pressure through tube 85, connector 84, tube 80, shrouded T 76, and connector 75 to the top of tank 71.

Operation of the Illustrated Embodiments

Referring to FIGS. 3 and 4 of the drawings, when a transmission 10 has been designated for a periodic maintenance procedure, the preliminary operations customarily undertaken include an inspection of the filter by removal of the fluid pan, inspection of the fluid therein to determine the wear and conditions to which the transmission has been subjected and then a complete renewal of the fluid for the entire transmission with clean fresh fluid after the filter has been renewed and the pan reinstalled. This is accomplished in the embodiment of FIG. 3 by providing quick disconnect fittings in one of the two fluid lines extending from a transmission to an external fluid cooler, such as the radiator on an automobile, and providing suitable connects to drain tube 52 and supply tube 47 for tank 36. Tank 36 has previously been completely drained of old fluid in the lower portion and filled with clean fresh fluid with the upper portion. After the proper connections have been made, the automobile is suitably chocked, braked, and the engine started and the transmission placed in drive. This causes the pump in the transmission to pump fluid to the outlet and inlet ports for circulating the fluid from the transmission to the fluid cooling means and, since tank 36 is connected in series with one of the fluid lines, fluid will be pumped into drain line 52, through sight glass 51 and check valve 50 to drain line 49 and into the lower portion, B, of tank 36 to exert a force upon diaphragm 37 to cause fresh clean fluid from the upper portion, A, of tank 36 to fluid supply tube 45 through sight glass 46 and fluid supply tube 47 to connector 44 and then to transmission 10. Since the pressure is dictated by the pump in transmission 10, the used fluid will be pumped into tank 36 as fresh clean fluid is returned to the transmission from tank 36 at the normal pressure existing in transmission 10. As the procedure is initiated, the used fluid in sight glass 51 will have a substantially different appearance from the clean fresh fluid passing through sight glass 46. When the visual characteristics of the fluids passing through sight glasses 51 and 46 are substantially the same, the transmission is placed in "park" (neutral), the engine is turned off and the procedure is now complete in that all of the fluid now present in transmission 10 will be fresh clean fluid which may then serve its lubricating, cleansing, maintenance and rehabilitation functions within transmission 10. Experience has shown that many malfunctioning transmissions which had been subjected to filter changing and limited fluid changing continued to malfunction. However, through applying the principles of my invention to provide a complete new charge of fresh, clean transmission fluid, many such malfunctioning transmissions were observed to regain their original operational characteristics.

In practicing the principles and apparatus of FIGS. 4 and 5, the pressure existing in intermediate outlet 22 on radiator 20 and inlet 16 on transmission 10 is determined by providing the appropriate quick connect-disconnect fittings thereon and inserting the apparatus of FIG. 5 in between the ports, energizing the transmission, putting it in gear, and idle and determining the pressure existing and the flow direction in that part of the system. The device is then disconnected and the apparatus of FIG. 4 substituted, taking into account direction of flow, as the flow direction in any given transmission installation may be reversed from that illustrated in my drawings and, it will be seen that my apparatus be connected up properly to receive used fluid and to supply clean, fresh fluid in the right amounts and at the right locations. Assuming the direction of flow is out of outlet 22 on radiator 20 and into inlet 16 on transmission 10, connector 43 is connected to outlet 22 and connector 44 is connected to inlet 16. The transmission is de-energized or shut off at this time and air under pressure is introduced through air tube 85 and Schrader valve 84 to charge my fluid changing apparatus to the pressure of the particular transmission. It is assumed, that tank 71 has been emptied by the opening of the valve to its drain port 73 and that tank 61 has been filled with fresh fluid through inlet 62. At this time, the valve in fluid supply line 45 is closed and check valve 51 is operable to prevent reverse flow of any fluid that may be present in tank 71 so that the two tanks and their interconnection through T 79 are effectively isolated from the atmosphere and the remainder of the system and air, at the pressure of the normal transmission operation as determined in the previous step, is free to circulate intermediate the tops of tanks 61 and 71 through the connections extending from T 79.

My system is now ready for a renewing or replacing of the fluid in a transmission. The automobile engine is again started and caused to run at idle and the transmission is placed in gear while the car is suitably chocked and braked and the valve on supply tube 45 is opened. Used, dirty transmission fluid will flow into tube 52 through check valve 51 and into the bottom of tank 71 and simultaneously the air disposed in tank 71 will be drive to the top of tank 61 so that it may cause the fluid of supply A to move upwardly through supply tube 64, sight glass 46, supply tube 47 and to inlet 16 on transmission 10 through quick connector 44. The process will continue until the fluid flowing through sight glasses 61 and 46 assumes substantially the same appearance at which point the operator will realize that the fluid has been completely renewed or replaced, the automobile engine turned off, the transmission returned to the "park" (neutral) position and the apparatus may then be disconnected. The used, dirty fluid B may then be discharged through port 73 on tank 71 and clean fresh fluid A may be placed in tank 61 through inlet 62 and the apparatus is ready for another fluid replacing procedure.

In the operation of the embodiment of FIG. 6, the direct connection intermediate tanks 61 and 71 has been replaced by independent connections to a source or sources of air under pressure 87 so that the top of tank 71 may be supplied with air under pressure which further controls through the operation of a relief valve 70 connected through T 79 to the top of tank 71 so as to maintain a constant pressure no greater than the pressure that may be supplied from the source of air under pressure or relief of valve 86. In this manner, as tank 71 is filled with used fluid, the pressure will not rise and the flow will remain substantially that caused by the pressure of the internal pressure of transmission 10.

In summary, my method is accomplished by interrupting a line extending from a transmission body to a fluid cooler; measuring the fluid flow characteristics as by direction and rate or the like; restricting the flow of used fluid to the normal rate as the fluid is permitted to drain from the line to a receptacle; and adding fresh fluid into the line to the transmission at the same flow rate.

Figure 7:
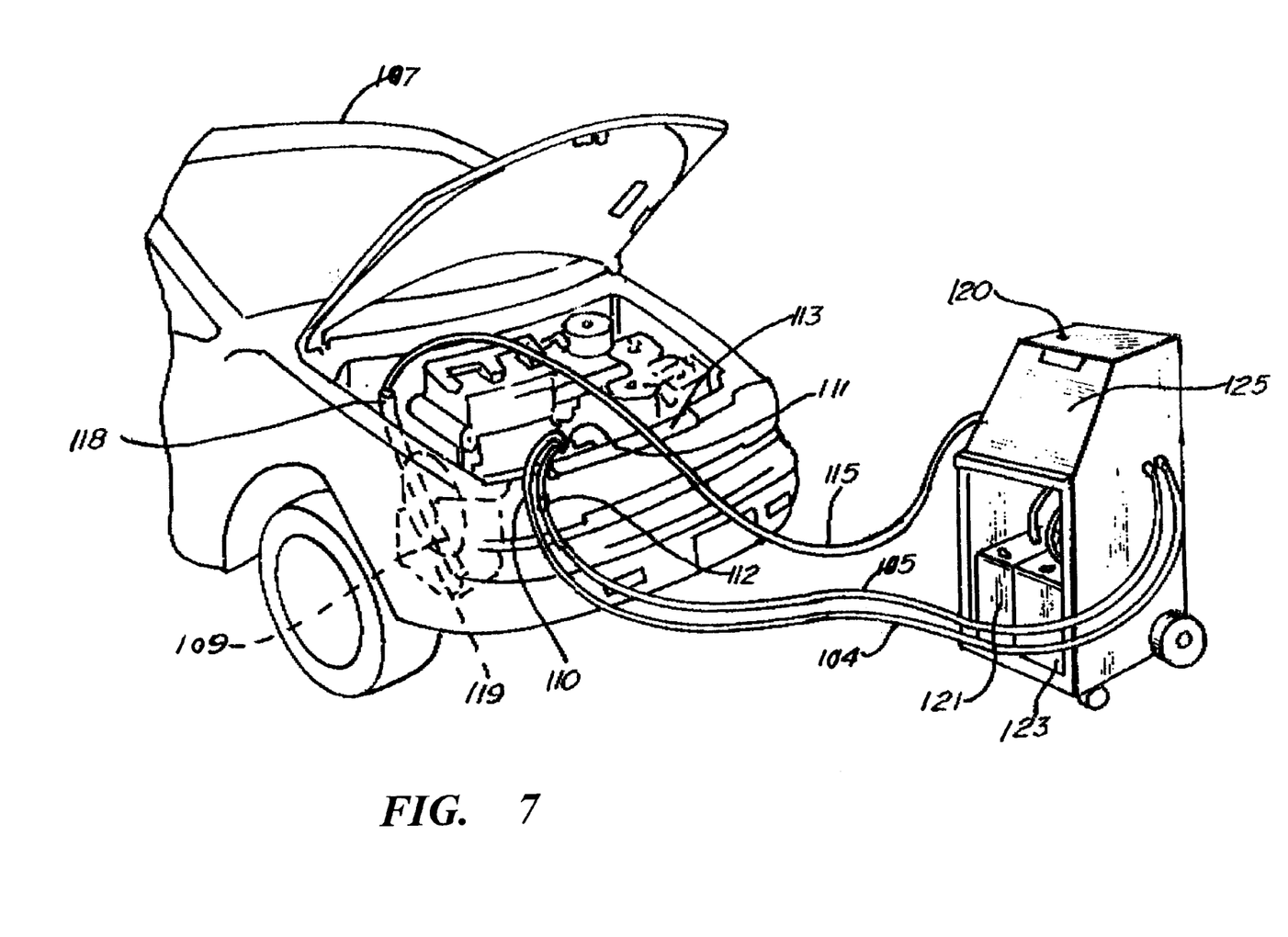
FIG. 7 is a representative illustration of another embodiment of the applicant's system as it is typically positioned with respect to the vehicle being serviced.
Figure 8:
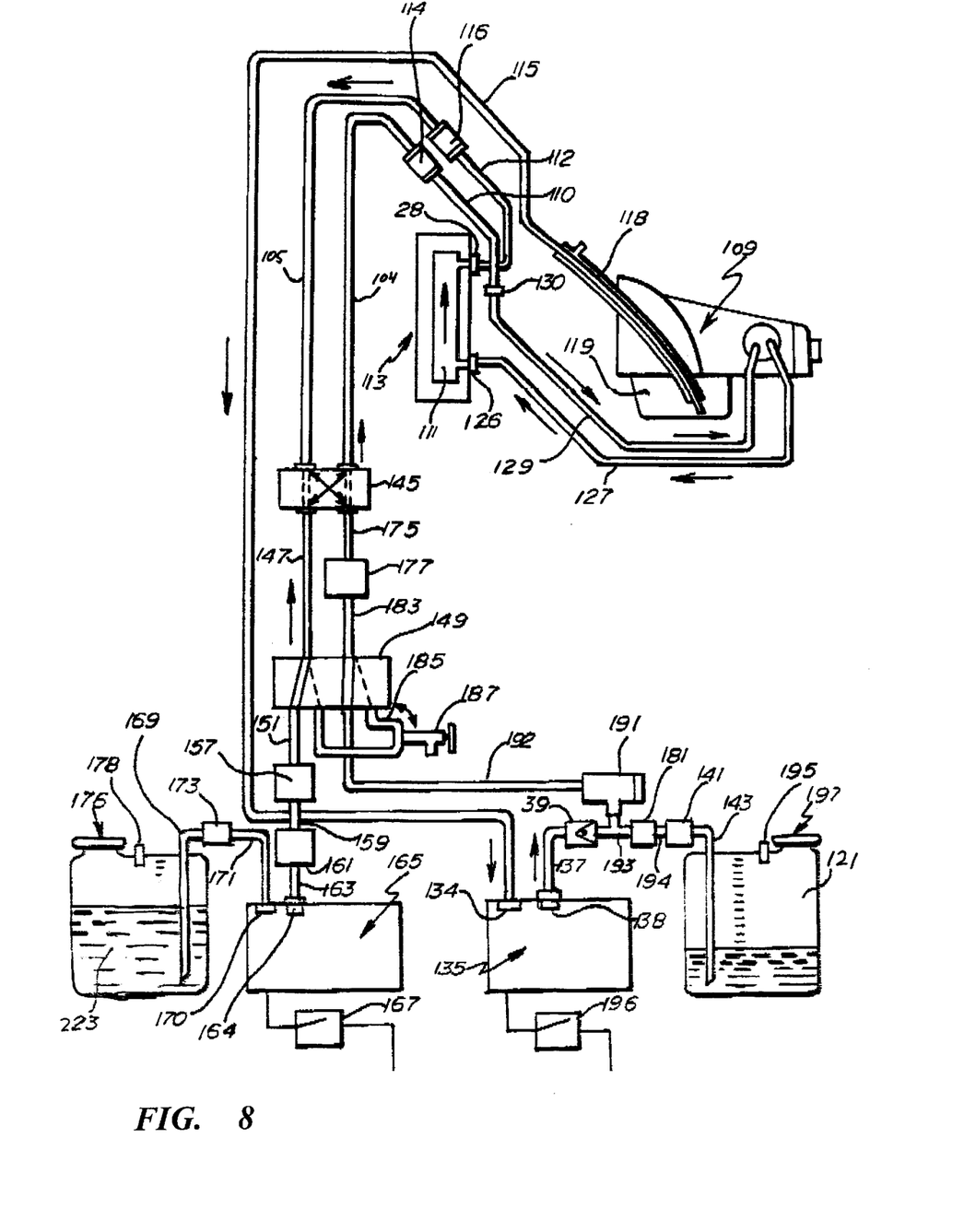
FIG. 8 is a schematic illustration of the embodiment of FIG. 7 interconnected to a vehicular automatic transmission to be serviced by the invention.
Figure 9:
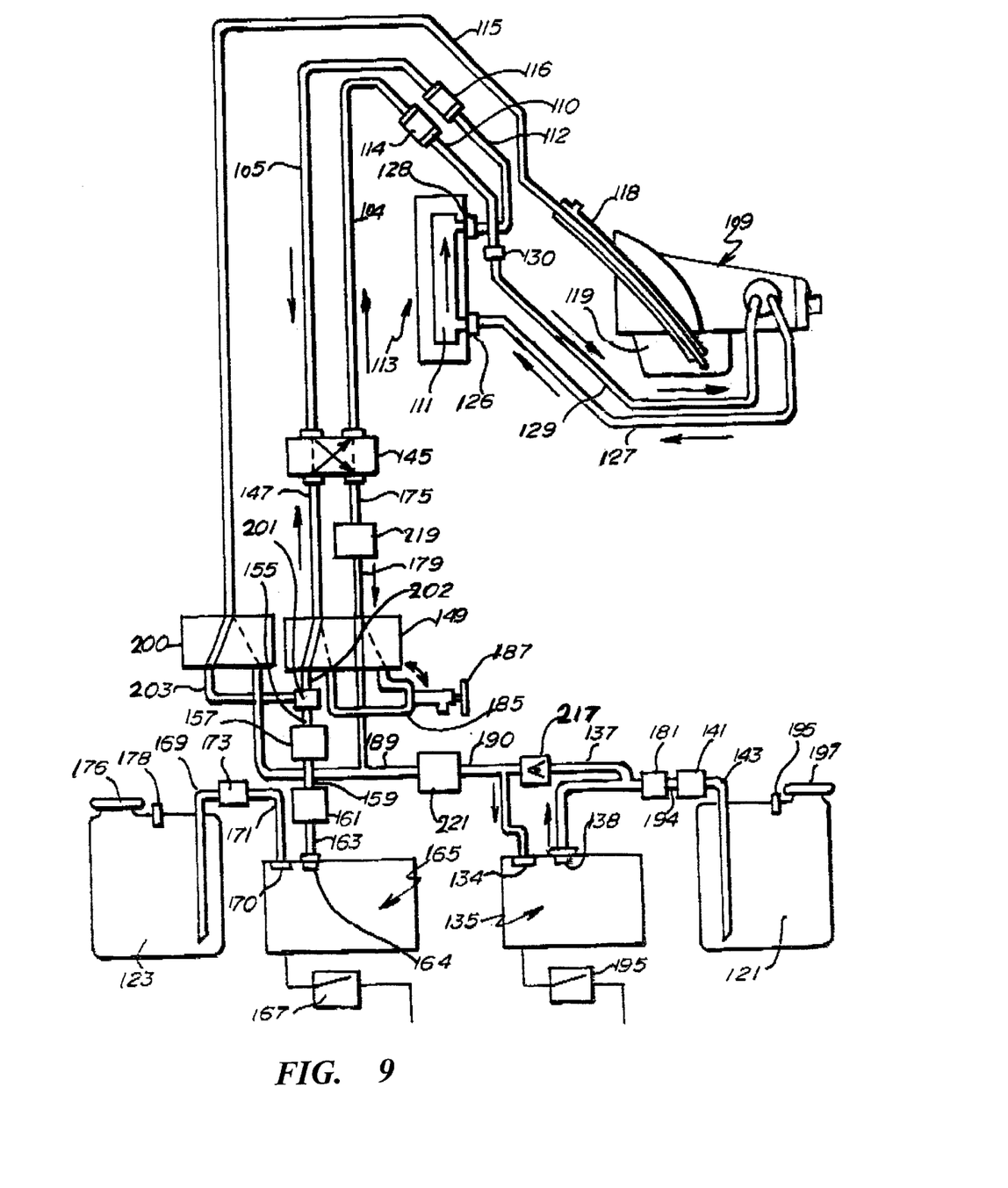
FIG. 9 is a schematic illustration of another embodiment interconnected and positioned to a vehicular automatic transmission to be serviced by the invention.

FIGS. 7–9 illustrate additional embodiments of an automatic transmission fluid exchange system 120 according to the present invention. FIG. 7 is a representative illustration of a complete fluid exchange system 120 as it is typically positioned with respect to a vehicle being serviced. Complete fluid exchange system 120 is interconnected via a pair of interchangeable input/output hoses (an input/output hose 104 and an input/output hose 105) to a vehicle 107 being serviced which has an automatic transmission 109.

Hoses 104 & 105 are connected to either side opened cooling circuit (not shown) of vehicle 107 which connects to and runs through a transmission cooler 111 which is an integral part of a radiator 113. This is done by making random connection to a pair of quick connect stems (a quick connect stem 110 and a quick connect stem 112) which have been interconnected to the cooling circuit. A pan access tube 115 has been inserted down into a transmission pan 119 via a transmission dipstick/filler tube 118. A used fluid receptacle 121 is used to receive the used fluid extracted from transmission 109 by the complete total fluid exchanger 120. A fresh fluid receptacle 123 is used to supply the fresh fluid which the Invention will introduce into transmission 109. Receptacle 123 is also used to supply the fresh fluid to pan 119 from a pan access tube 115 in the second embodiment illustrated in FIG. 9. A control panel 125 is located on the front top of the complete fluid exchange system 120.

FIG. 8 is an illustration of the embodiment of the complete fluid exchange system 120 which is randomly interconnected to both sides of an opened fluid cooling circuit 127/111/129, designated as 127/111/29 because before being opened it is comprised of a cooling outlet line 127, a transmission fluid cooler 111 inside a radiator 113 and a cooling return line 129, each of which form together a connected, complete cooling circuit of transmission 109. Input/output hoses 104 & 105 are shown interconnected to both sides of cooling circuit 17/11/129. Hose 104 is connected to line 129 at connector 130, through stem 110 which is connected to hose 104 by quick connector 114. Stem 110 is connected to the end of line 129 at connector 130 after connector 130 has been disconnected from a port 128 of cooler 111 (as an alternative choice, a port 126 of cooler 111 can be disconnected for the interconnection location if preferred by the operator). Hose 105 is connected to line 127 through stem 112 which is connected to hose 105 by quick connector 116 which is connected to opened port 128 of cooler 111, thereby connecting hose 105 to a transmission cooler 111 located in radiator 113. Input/output hoses 104 & 105 are connected to two different ports, one each, of a flow alignment valve 145.

One end of pan access tube 115 is connected to an auxiliary pump suction port 134 of an auxiliary pump assembly 135 With the other end of tube 115 inserted down dipstick/filler tube 118 into and down to the bottom of pan 119. Auxiliary pump 135 can be activated by an electric power supply switch 196, and when activated pump 135 delivers low pressure to pan access tube 115, causing used fluid to flow through tube 115 to enter suction port 134 and to be pumped out of an outlet port 138 of pump 135 into an outlet line 137 of pump 135. Outlet line 137 is connected to outlet port 138 at one end and connected to a check valve 139 at the other end. A three port used fluid delivery line 193 connects check valve 139 to a fluid clarity sensor 181 and to the downstream side of an adjustable relief valve 191.

A used fluid delivery line 194 connects clarity sensor 181 to a quick connector 141 which connects line 194 to a used fluid delivery line 143 which carries the used fluid extracted from the transmission into used fluid receptacle 121.

Used fluid receptacle 121 has an opening with a closure 197 and a vent tube 195. Receptacle 121 has volume level indicating marks numbered in quarts (not shown). Input/output lines 104 & 105 are connected to flow alignment valve 145 which is shown in simple terms but can exist in many different forms without departing from the basic principle or art.

A used fluid delivery line 192 connects one port of a main on-off valve 149 to an adjustable relief valve 191. (Main valve 149 is a combination, multi-port, two-position flow direction selector valve-ports are not shown numbered specifically.) A fluid delivery line 147 is connects one port of main valve 149 to one port of flow alignment valve 145. Fresh fluid receptacle 123 is connected to a suction tube 169 which is in turn connected by a quick connector 173 to a fresh fluid suction line 171 which is connected to a suction port 170 of a main pump 165. An opening with closure 176 and a vent tube 178 is provided to fresh fluid receptacle 123. Receptacle 123 has volume indicating marks present similar to used fluid receptacle 121, but reversed to illustrate quarts of used fluid deposited (marks not shown).

Main pump 165 can be activated by an electric power supply switch 167, and when activated pumps fresh fluid through an outlet port 164, into a fresh fluid delivery line 163 and through adjustable flow regulator 161. A fresh fluid delivery line 159 connects regulator 161 to a combination rate of flow and total volume of flow indicator/meter which indicates rate of flow and volume of fresh flow delivered, a fresh fluid flow rate/totalizer meter 157. Fresh fluid delivery line 151 connects meter 157 to main valve 149. A fluid delivery line 147 connects one port of main valve 149 to one port of flow alignment valve 145.

A used fluid delivery line 183 connects one port of main valve 149 to a bidirectional combination indicator/meter which indicates direction of used flow, rate of used flow, and total volume of used flow, a used flow rate/totalizer meter 177. A used fluid delivery line 175 connects meter 177 to one port of flow alignment valve 145. A three port used fluid bypass line 185 connects two ports of main valve 149 with a sample tap 187.

Description of Operation of the Embodiment Illustrated in FIG. 8

To initiate the use of the invention, used fluid receptacle 121 is emptied through an opening with closure 197 after disconnecting connector 141 and then reconnected to connector 141 so that an empty receptacle is available to receive the used fluid extracted from the transmission 109 being serviced. Fresh fluid receptacle 123 is filled through an opening in closure 176 while in place, but receptacle 123 can be removed by disconnecting it at connector 173 to fill it, and then replacing it in position in the complete fluid exchanger system 120 (FIG. 7) and reconnecting connector 173. In heavy duty or fleet applications, it is commercially useful to connect the invention to receptacles much larger than receptacles 121 & 123, but because the operating principles remain the same, it should be considered an extension of this same art and practice.

The cooling circuit 127/111/29 is opened at port 128 where line 129 is connected to cooler 111. The operator's selection of the location to open cooling circuit 127/111/29 at port 128 is random and made at the preference of the operator as a matter of ease and convenience. There are a number of other areas circuit 127/111/29 is suitable for opening, including connection 126.

Stem 112 is connected to the outlet side of the opened cooling circuit, outlet line 127 by connecting it to port 128 of cooler 111 and stem 110 is connected to the inlet side of the opened cooling circuit by connecting it to connector 130 of cooling return line 129. The invention's input/output hoses 104 & 105 are randomly connected to the opened cooling circuit 127/111/129, but in this illustration for sake of example input/output hose 104 is connected to cooling return line 129 through stem 110, and input/output hose 105 is connected to cooling outlet line 127 thought cooler 111 and stem 112. Pan access tube 115 has been inserted directly into the bottom of pan 119 by pushing it down dipstick/filler tube 118.

The invention is now ready to be operated. The vehicle is started and run with the transmission in park and the fluid level of pan 119 is checked and corrected if out of the range desired. The used fluid contained in transmission 109 is now circulating through cooling line 127 into hose 105 through stem 106 which is connected to hose 105 by quick connector 116 and into the invention, through the invention, and out of the complete fluid exchanger 120 (FIG. 7) and back through hose 104 and into the cooling return line 129 as the complete fluid exchanger 120 (FIG. 7) functions in an Off/bypass mode with the transmission operating in park (indicated with dotted lines at main valve 49). The used fluid flows from line 127 to hose 105 to flow alignment valve 145, through valve 145 into line 175 to used meter 177.

The used fluid from hose 105 then flows from meter 177 through line 183 to main valve 149, through main valve 149 and into bypass line 185 and back through valve 149 to line 147, through line 147 to alignment valve 145, through alignment valve 145 to input/output hose 104, and through quick connector 114, through stem 110 and into cooling return line 129 which carries the used fluid back into transmission 109.

Flow alignment valve 145 is controlled in response to the direction of flow indicated at meter 177. Flow alignment valve 145 is a two position flow direction selector valve which switches direction of flow between lines connecting valve 145 and main valve 149, thus providing the capability to randomly connect the input/outlet hoses 104 & 105 to either side of opened cooling circuit 127/111/29. Alignment valve 145 permits quick alignment of the direction of flow in cooling circuit 127/111/29 with the direction of flow in the two main subsystems, the used fluid extraction system and the fresh fluid introduction system which are contained in the complete fluid exchange system. In the embodiment illustrated in FIG. 8 valves 145 & 149 and used flow meter 177 are mechanically operated and can also be electrically operated, microprocessor controlled, and electronically indicating. While very sophisticated electronic microprocessor combinations can be used to make the contents of the invention more compact, they certainly retain the same principles or art utilized in FIG. 8 and should not be considered significant variants of the novel art presented herein.

Also, valves 145 & 149 as depicted in FIG. 8 are illustrated in most basic form for simplicity of illustration. Various other more dispersed variants comprised of multiple solenoid or manually operated subunits can be utilized which operate under the same principle of art when examined in unity, but do not vary from the actual scope of what is illustrated in this embodiment.

If the used fluid is flowing through cooling circuit 127/111/29 such that when randomly connected to the invention with valve 149 in its Off/bypass mode (dotted line) meter 177 indicates that the flow is not in alignment with the invention, then flow alignment valve 145 is actuated to its second, alternate position which institutes a flow alignment condition which is clearly indicated at meter 177.

Meter 177 then indicates proper flow alignment, and also indicates the rate of flow at which the used fluid is being circulated through cooling circuit 127/111/29 as bypassed through closed loop 185 and the operator makes note of this.

Because main valve 149 is in its Off/bypass position (dotted lines), the used fluid passes only through the valve ports connected to both sides of bypass line 185. The operator then uses sample tap 187 to draw a sample of the used fluid circulating in the cooling circuit into a clear sample vial to later give to the vehicle's owner.

The engine is then turned off which inactivates transmission 109 placing it in a static mode. Electrical supply switch 196 is then activated by the operator which activates auxiliary pump 135 which applies low pressure to the used fluid in pan 119 via tube 115. Tube 115 is a clear hose which allows the operator to visually monitor the presence and approximate clarity (estimated degree of non-contamination) of the used fluid which then is forced by air pressure into line 115, through pump 135 and then deposited in used receptacle 121.

The actual clarity of the used fluid being extracted is indicated by clarity indicator 181, which in a microprocessor operated embodiment, provides electronic indicating signals to the microprocessor.

When the operator notices that the used fluid from pan 119 passing through tube 115 runs out and only air is being pushed through the line by atmospheric air pressure, suggesting the pan is near empty or empty, the operator activates electrical supply switch 167 which activates main pump 165 which applies low pressure to the fresh fluid contained in tank 123 through lines 171 & 169. This causes the fresh fluid to move into inlet port 170 of pump 165 where pressure is applied to force it into line 163 and all other lines down line from line 163 which will be connected to it when main valve 149 is activated.

The operator then moves main valve 149 to in secondary or On position (solid line) which allows the fresh fluid forced into line 163 by pump 165 to flow through flow regulator 161 through line 159 to flow meter 157, through line 151 to the main valve 149 to line 147, through line 147 to alignment valve 145, through alignment valve 145 and to input/output hose 104 and then into the return cooling line 129. As the fresh fluid now flows through the fresh fluid introduction subsystem of the invention and into the return side of the opened cooling circuit, it then flows to the internal transmission components downstream to the return side of the cooling circuit and eventually comes to rest in pan 119. As this fresh fluid so flows, the operator adjusts flow regulator 161 such that the rate of flow of fresh fluid approximately matches the rate at which used fluid was measured at meter 177 to have been circulating at in the cooling circuit when the invention was in bypass mode with the transmission operating in park. After so operating the invention for a brief period, the operator notices that fluid begins to flow once again through tube 115 and later begins to show clarity in tube 115 and at used clarity sensor 181, suggesting that the return cooling line and its downstream components and circuits have been flushed and purged into pan 109. As the fluid now moving through tube 115 reaches clarity, the operator inactivates main valve 149 by moving its selector to the alternate Off/bypass position, which leaves pump 165 on, but not delivering fresh fluid into transmission 109 because main valve 149 now has closed fresh fluid delivery line 151 (this will not harm the pump because it has an internal relief/unloader system designed to protect it during these times of running and not delivering fresh fluid into transmission 109).

The operator then examines the volume indicating marks of both receptacles 121 & 123 (not shown specifically) and subtracts the approximate volume of fresh fluid delivered from the used fluid received to calculate the approximate volume of additional fresh fluid that must now be pumped into pan 119 through the cooling return line 129 in order to fill it to its normal operating level so the dynamic part of the complete fluid exchange can be instituted. The operator again activates valve 149 (with the transmission still not operating) and continues adding fresh fluid to pan 119 through cooling return line 129 until the additional calculated amount has been introduced into the pan as indicated on fresh receptacle 123 by its volume indicating marks. Main valve 149 is now moved to its Off/bypass mode position once again.

The static part of the complete fluid exchange has been completed. The return cooling line 127 and its downstream circuits and components including pan 119 have been flushed, purged, cleaned and then refilled and left holding fresh fluid. Pan 119 is now filled with the proper amount of fresh fluid. Now the operator is ready to institute the dynamic part of the complete fluid exchange.

The vehicle is now started and idled with the transmission 109 placed in park and main valve 149 is simultaneously activated by moving it to its On position which begins the dynamic part of the complete fluid exchange in which fresh fluid is pumped from receptacle 123 into return cooling line 129 and used fluid is extracted out of cooling outlet line 127 from the transmission components which were not already flushed, purged, cleaned and refilled during the static part of the complete fluid exchange.

As main valve 149 is activated, adjustable relief valve 191 is quickly calibrated to cause the rate of flow of used fluid to approximate the rate of flow of fresh fluid as indicated at fresh flow indicator 177, and an approximate balance between the rate at which fresh fluid flows into transmission 109 at and the rate that used fluid flows out of transmission 109 at now occurs. That is, fresh fluid is now being introduced into cooling return line 129 at essentially the same approximate rate that used fluid is being extracted from cooling outlet line 127.

The complete fluid exchange is continued at this essentially balanced rate of fluid exchange until clarity sensor 181 indicates that the fluid being extracted from cooling outlet line 127 is now substantially as clean as fresh fluid which confirms that essentially all of the fluid circulating in the transmission is fresh now. This also indicates that the transmission has been completely flushed, purged, cleaned and refilled with fresh fluid.

When the desired clarity of the fluid being extracted from cooling outlet line 127 is attained as indicated by sensor 181, the main valve is inactivated, again placing the invention in its Off/bypass mode and the final fluid sample is taken at tap 187 by the operator who will give it and the first sample to the vehicle owner or customer.

The complete fluid exchange system 120 (FIG. 7) is now turned off (even when off it will still allow the transmission's fluid to pass through its input/output hoses 104 & 105 in either direction, unobstructed). Then the vehicle is turned off as well.

The operator can examine the volume indicating marks on fresh receptacle 123 which will indicate just how much fresh fluid was used for purposes of billing the vehicle's owner and for maintaining inventory control of fresh fluid supplies.

Input/output hoses 104 & 105 are now disconnected at quick connectors 114 & 116. Stems 110 & 112 are then disconnected from both sides of the opened cooling circuit at port 128 and connection 130. Cooling return line 129 is then reconnected to port 128 at connection 130 to close the previously opened cooling system 127/111/29.

The vehicle is now started with the transmission in park and the operator checks the cooling circuit for any leaks should the connections not be secure. The operator then checks the fluid level of the transmission by use of the dipstick (not shown) inserted in dipstick/filler tube 118. The Complete Fluid Exchange as instituted by use of the first embodiment as illustrated in FIG. 8 is now finished.

FIG. 9 is an illustration of another preferred embodiment of the Invention, the complete fluid exchange system which like the embodiment illustrated in FIG. 8, has been randomly interconnected to both sides of the opened cooling circuit comprised of cooling outlet line 127, transmission 111 inside radiator 113 and cooling return line 129, each of which form together as connected, the complete cooling circuit 127/111/29 of transmission 109. Both embodiments share most of the integral components and/or means utilized. The second and preferred embodiment is electrically powered and electronically controlled by a microprocessor system provided with suitable software. The microprocessor receives electronic indicating signals from electronically indicating sensors and meters, processes them according to the software specifications and then elicits electronic command signals to individual components which are electronically controlled and electrically powered. The specific wiring harness, microprocessor parts, circuits and connectors are not included in FIG. 9 for sake of brevity and because they are quite basic to their art. Lack of specific inclusion of all microcircuit diagrams, which are microscopic, and lack of inclusion of all wiring, connection and power supply specifies should not be construed to limit the scope of the novel art inclusive to this embodiment.

Input/output lines 104 & 105 are shown interconnected to both sides of the cooling circuit comprised of 127 & 129 with line 104 connected to line 129 via stem 110 which is connected to the end of line 129 which was disconnected from port 128. Line 105 is connected to line 127 via stem 112 which is connected opened port 128 which also at the same time connects line 105 to a cooler 111 located in radiator 113. One end of pan access tube 115 is connected to the one port of an auxiliary three way valve 200 and the other end of tube 115 has been inserted down dipstick/filler tube 118 and to the bottom of pan 119.

A three port used fluid delivery line 189 connects a combination used fluid flow rate/totalizer meter 121 to one port of main valve 149 and to one port of the auxiliary valve 200. A three port used fluid delivery line 190 connects meter 221 to a check valve 217 and to port 134 of auxiliary pump 135. Pump 135 has an outlet port 138 which is connected to a three port used fluid delivery line 137 which connects port 138 to check valve 217 and to a fluid clarity sensor 181. A used fluid delivery line 194 connects clarity sensor 181 to connector 141 which is connected to a used fluid delivery line 143 which extends into a used reservoir 121. Used reservoir 121 is provided with opening with closure 197 and vent tube 195. A used fluid delivery line 175 connects flow alignment valve 145 to a combination flow direction, rate of flow meter 219 which is connected to main valve 149 by a used fluid delivery line 179.

Input/output hoses 104 & 105 are connected to a flow alignment valve 145 which is shown in simple terms but can exist in many different forms or combinations without departing from the basic principle or art. There are many different ways to organize smaller solenoid valves and similar means to attain the same principles of novel art contained in this embodiment and it should be assumed that it is not necessary to list every single alternative possible to define the spirit and method of such novel art.

A fluid delivery line 147 is connected to one port of flow alignment valve 145 at one end and to one port of main valve 149 which serves as a combination, two position, on/off valve with two modes of operation. One mode results when main valve 149 is in the Off/bypass position (dotted lines) where lines 247 and 279 are connected together by a used fluid bypass line 185 which is also connected to sample tap 187. The second mode results when main valve 149 is in the On position (solid lines) where line 147 is connected to line 202 and line 179 is connected to a 3 ported used fluid delivery line 189.

Main valve 149 is shown in simple terms but can exist in many different much more sophisticated, complex forms without departing from the basic principle or art. The ports are not numbered for sake of simplicity and due to common understanding of one knowledgeable in the art.

Fresh fluid receptacle 123 is connected by suction tube 169 which is in turn connected by connector 173 to fresh fluid suction tube 171 which transports fresh fluid into the inlet port 170 of main fresh fluid pump 165. Opening with closure 176 and vent tube 178 is provided to fresh fluid receptacle 123. Main pump 165 is electrically powered by a source energized by switch 167. Outlet port 164 of pump 165 is connected to adjustable flow regulator 161 by a fresh fluid output delivery line 163. A fresh fluid delivery line 159 connects adjustable flow regulator 161 to fresh fluid flow rate/totalizer meter 157. Fresh flow meter 157 is connected by fresh fluid delivery line 155 to a fluid proportioning valve 201, which is comprised in this case of an adjustable relief valve which has two ports. One port, the regulated port, is connected by a fresh fluid delivery line 202 to one port of main valve 149. The other port, the relieved port, is connected by a fresh fluid delivery line 203 to a port on auxiliary valve 200.

Each of these valves is connected via a wiring harness to a microprocessor system which receives electronic indicator signals, and processes them according to the suitable software design installed in the microprocessor assembly. The microprocessor assembly, after processing indicator signals according to the software design, then elicits electronic command signals to appropriate valves and controls which are electronically activated and electrically powered. In this manner, then, many of the invention's operations are instituted.

It should be understood that if all of these valves and indicators were strictly mechanical and manually operated instead of electrically powered, electronically controlled and operated as described in this embodiment, there would be no significant difference in scope or function from the principles of novel art utilized in this invention.

It should also be understood that there are many different ways to pump fluid, that is, there are many different suitable ways to apply pressure to fluid for purposes of forcing it through a line and a number of ways to apply low pressure to the fluid in a line such that atmospheric or air pressure will force it through that line in the direction of the low pressure as intended. Pumping systems can be powered by gravity, heat, electricity, fuel operated motors, and other means. The actual means used to apply pressure or low pressure to the fluid is not important, but it is the principle of the art which is important as expressed in the overall function of the pumping system and what it can attain. It should not be construed that by not listing all possible specific pumping possibilities by including numerous additional embodiments with minor changes to illustrate them, that the scope of the art illustrated in this embodiment is in any way limited by such constraint which was exercised for sake of brevity.

All possible design layouts and similar combinations within the scope of this novel art have not been included for the sake of brevity. Minor changes in layout which do not significantly depart from the spirit of this art should not be construed to be significantly divergent.

To initiate the use of the invention, used fluid receptacle 121 is emptied through tank access cap 197 after disconnecting connector 141 and then reconnected to connector 141 so that an empty receptacle is available to receive the used fluid extracted from the automatic transmission being serviced. Fresh fluid receptacle 123 has been filled through tank access cap 176 with the tank in place, but tank 123 could have been removed by disconnecting it at quick connector 173, filling it and then returning it into position in the invention (FIG. 7) and reconnecting connector 173.

In heavy duty or fleet applications, the invention is hooked up to much larger tanks in lieu of receptacles 121 & 123 respectively which do not require emptying at each service operation, but only periodically after a substantial number of services depending on the size of the receptacles.

Since the operating principles remain the same, such minor modifications should be considered an extension of this same art and practice.

Lines 127 & 129 which connected to a cooler 111 located in the vehicle's radiator 113 comprise the cooling circuit and are designated as 127/111/29. Cooling circuit 127/111/29 is opened at a cooler port 128 by disconnecting cooling line 129 where line 129 is connected to cooler 111. The selection of where to open the cooling circuit 27/11/29 is made at the preference of the operator as a matter of ease and convenience. There are a number of other areas circuit 127/111/29 could be opened including connection 126.

Stem 110 is connected to the outlet side of the opened cooling circuit 127 at connector 130 of line 129. Stem 112 is connected to port 128 on 111. The invention's input/output hoses 104 & 105 are randomly connected to the opened cooling circuit 127/111/29, but in this illustration for sake of example are shown as input/output hose 104 connected to cooling line 129 through stem 110, and input/output hose 105 connected to cooling outlet line 127 through cooler 111 and stem 112. Pan access tube 115 has been inserted directly down into the bottom of pan 119 by pushing it down dipstick/filler tube 118.

The invention is now ready to be operated. The vehicle is started and run with the transmission in park and the fluid level of pan 119 is checked. If it is not at the normal operating level that is corrected. The invention is turned on by activating an on/off power switch on the control panel which is not shown for sake of brevity.

The used fluid contained in transmission 109 is now circulated through cooling outlet line 127 into hose 105 into, through and then out of the complete fluid exchanger system 120 (FIG. 7) and back through hose 104 and into the cooling return line 129 as the invention functions in an Off/bypass mode due to the position that main valve 149 is in (as indicated by the dotted lines).

The used fluid flows from hose 105 through flow alignment valve 145 into line 175 which delivers it to meter 219 which indicates that the used fluid is flowing in the correct direction, and that the invention is in proper alignment with the direction of flow in the cooling circuit. Meter 219 also indicates the rate at which the used fluid is flowing through the cooling circuit which has been reclosed by line 185 in combination with main valve 149 being in its Off/bypass mode. The used fluid now flows from meter 219 through line 179 to one port of main valve 149, through used fluid bypass line 185, back through main valve 149 and out of valve 149 through line 147 to alignment valve 145 and into line 104 and finally through cooling return line 129.

If the direction of flow in the cooling circuit was reversed and not flowing in alignment with the complete fluid exchange system 120 (FIG. 7) it would still flow through a closed loop bypass which flows in and out of main valve 149 through bypass line 185, but meter 219 would indicate a non-alignment condition which would automatically signal the microprocessor which would then trigger a signal to an electric solenoid to move alignment valve 145 to its alternate position, thus establishing alignment between the direction of flow in the cooling circuit of the vehicle being serviced and the direction of flow within the invention as indicated at meter 219. The direction of flow of the used fluid through this closed loop is established by how each one of hoses 104 and 105 were selected to attach to each one of the stems 110 or 112. The invention allows for speedy random choice in making this connection by the operator, an important commercial consideration. FIG. 9 illustrates correct alignment for sake of illustration with solid lines at valve 145.

The used fluid from the cooling outlet line 127 is now flowing through the invention in the correct direction through bypass line 185 and back into cooling return line 129. The operator now takes a sample of the fluid from sample tap 187, running it into a clear vial. This is the initial sample of fluid before the complete fluid exchange is instituted and will be given to the vehicle owner or customer along with the second sample that is drawn after all of the fluid of transmission 109 has been changed by the complete fluid exchange system 120 (FIG. 7).

Now that the sample is taken, the engine is then turned off which inactivates transmission 109 placing it in a static mode. The operator activates an electrical supply switch mounted on a control panel 125 (see FIG. 7 for the location of the control panel, details not shown) which activates the microprocessor which in turn closed the power supply switch 195 thereby activating the auxiliary pump 135 which applies low pressure to the used fluid in pan 119 via tube 115 through auxiliary Valve 200 which is at rest in its off position (dotted line).

This application of low pressure into and through tube 115 results in the fluid contained in pan 119 moving up into tube 115 and through valve 200, through line 189 through meter 221 through auxiliary pump 135 and out of pump 135 through line 137, through clarity sensor 181 and through line 143 and into the used reservoir 121. When clarity sensor 181 indicates a lack of fluid clarity, the microprocessor activates fresh fluid supply pump 165 by closing electric supply switch 167 and activates main valve 149 placing it in its On position (indicated by solid lines).

The activation of pump 165 with valve 149 results in fresh fluid being forced from port 164 of pump 135 through line 163 through adjustable flow regulator 161, through line 159 through meter 157, through line 155 to adjustable relief valve 201 (used as a proportioning valve set to minimum line pressure necessary to prevent starvation in line 29) and into line 102, through main valve 149 to line 147, through alignment valve 145, to hose 104 which carries the fresh fluid into the cooling return line. This fresh fluid flushes, purges, cleans and refills those down line transmission components while simultaneously depositing the diluted, mixture of clean and used fluid in the pan 119 (FIG. 7) where it is forced out by atmospheric air pressure through tube 115 and into receptacle 121, while pump 135 is still running and connected to tube 115. Proportioning valve 201 is a spring loaded relief type valve which is set to keep a minimum pressure on the return cooling line 129 in the range of 10–15 PSI, such that there will not be any fluid starvation type conditions, or overpressurization down-line which could damage downstream transmission components. This valve is set such that the majority of the fresh fluid being introduced into transmission 109 will be through pan access tube 115 for most vehicles.

The mixed, diluted fluid from the down line components of the cooling return line 129 is deposited and removed by tube 115 as it is deposited in pan 119 (FIG. 7) with increasing clarity as time passes. As soon as clarity sensor 181 indicates that the fluid being extracted through tube 115 is essentially as clean as fresh fluid, the microprocessor sends a command signal to turn off main valve 149 and another signal to turn on the auxiliary valve 200 (solid line) such that it allows fresh fluid to be pumped into the pan directly through tube 115 from pump 165 until the pan has been filled. This amount has been calculated by the microprocessor based on previous signal input from meter 221, which has indicated how much fluid was extracted so far.

The microprocessor will move switch 167 to its Off position when it receives a signal from fresh fluid totalizer meter 157 that the same amount of fluid has been pumped out of fresh fluid reservoir 123 that has been received in used fluid reservoir 121 as indicated by meter 221. This result will cause a toned/lighted signal to be given off by the microprocessor through an indicator mounted on control panel 125 (FIG. 7, not specifically shown) to signal the operator that the static part of the complete fluid exchange is now complete and both pumps 165 & 135 are deactivated. Now the operator is ready to institute the dynamic part of the complete fluid exchange.

The vehicle is started and run with the transmission in park. Meter 219 indicates to the microprocessor that used fluid is flowing out of the cooling outlet line into used fluid bypass line 185 and this causes the microprocessor to send command signals which simultaneously activate both pumps 165 & 135, and at the same time move main valve 149 to its On position (solid line) and also move auxiliary valve 200 to its On position (solid line). This combination of signals cause fresh fluid to be pumped through hose 104 into the return cooling line 129 and through tube 115 directly into the transmission pan, both simultaneously.

At the same time fresh fluid is being pumped into the transmission at two different entry points (pan 119 and return cooling line 129), auxiliary pump 119 is applying low pressure to line 137 which increases the flow of used fluid out of the transmission through cooling outlet line 127, especially in low flow situations occasionally encountered with small foreign type designed transmissions. This used fluid which is being pumped out of transmission 109 through cooling outlet line 127, ending up in used reservoir 121, is pumped out by force applied by transmission 109's own internal pump, added to the low pressure applied from pump 135.

The rate at which used fluid is being extracted from the cooling outlet line 127 and into used receptacle 121 is measured by meter 221. The overall sum/total rate at which fresh fluid is being pumped into the transmission through lines 115 and 129 is indicated by meter 157. This rate is kept closely matched to the rate of used fluid extraction as indicated by meter 221.

The balance maintained between the total amount of fresh fluid introduced into the transmission (from both loci, pan access tube 115 and hose 104) with the total amount of used fluid extracted is based on the microprocessor's comparative processing of indicating signals from meter 221 and meter 157. The microprocessors command signals to adjustable flow regulator 161 places total fresh fluid flow at the desired levels during the dynamic part of the complete fluid exchange.

This process of introducing fresh fluid at two different loci into transmission 109 at an overall rate which is balanced to the rate at which used fluid is being extracted continues until clarity sensor 181 indicates that the used fluid being extracted has the same essential clarity as fresh fluid.

At this point the microprocessor sends command signals to deactivate both pump 165 and pump 135 and to move main valve 149 back to its Off/bypass position. This allows the fluid to now once again circulate through bypass line 185. The operator now takes the final fluid sample from tap 187 which has the same clarity of the fluid circulating in the cooling circuit 127/111/29, which also has the same essential clarity as the last volume of fluid which passed through clarity sensor 181. The dynamic part of the Complete Fluid Exchange is now over and the vehicle's engine is stopped.

Hoses 104 & 105 are now disconnected at connectors 114 & 116. Stems 110 & 112 are then disconnected from both sides of the opened cooling circuit at port 128 and connector 130. Cooling return line 129 is then reconnected to port 128 at connector 130 to reclose the opened cooling system 127/111/29.

The vehicle is now started with the transmission in park and the operator checks the cooling circuit for any leaks should the connections not be secure. The operator then checks the fluid level of the transmission by use of a dipstick (not shown) inserted in dipstick/filler tube 118.

The complete fluid exchange as instituted by use of the second embodiment as illustrated in FIG. 9 is now finished. The operator turns off the Invention and moves it out of position so that the vehicle can be moved. Periodically the microprocessor is downloaded to monitor fresh fluid usage for purposes of inventory control.

While my above description contains many specifics, these should not be construed as limitations on the scope of the invention, but rather as exemplification of two embodiments thereof. For example, there are many similar ways to illustrate certain of the device's valve and indicator functions as numerous single entity components organized in more complex fashion while functioning in the same overall manner as illustrated in my figures and described in my specifications. These variants should not be construed as significantly different from the novel art presented in my specifications or claims but should be considered as a part of this same novel art my device is based on. These many possible small changes and alternative methods to express the same principles of the novel art of my device are not important enough to illustrate in the drawings. Accordingly, the scope of the invention should be determined not by the embodiments illustrated, but by the appended claims and their legal equivalents.

What is claimed is:

1. A method for exchanging a used fluid with a fresh fluid in a vehicle having an automatic transmission connected to a fluid circuit, said used fluid initially being contained within said transmission and said fluid circuit, at least a substantial portion of which is subsequently discharged into a receptacle, said fresh fluid initially being contained in a source container, said method comprising the steps of:

providing a fluid exchange system having a first conduit for communicating fresh fluid to the transmission and a second conduit for communicating used fluid from the transmission;

coupling said fluid exchange system to the fluid circuit of the vehicle such that the used fluid flows from the transmission through the second conduit during an exchange procedure;

coupling said fluid exchange system to the fluid circuit of the vehicle such that the fresh fluid flows to the transmission through the first conduit during the exchange procedure; and providing a movable component in fluid communication with both the used fluid and fresh fluid during the exchange procedure, said movable component being biased to control a fluid flow within the fluid exchange system prior to or during the exchange procedure, and wherein during the exchange procedure said fluid exchange system introduces a quantity of fresh fluid to the fluid circuit of the vehicle at a first flow rate as the used fluid is expelled from the fluid circuit through the second conduit at a second flow, said first flow rate being substantially matched to the second flow rate.

2. The method of claim 1, wherein the step of providing a movable component includes the step of providing a receiver having an internally disposed diaphragm element.

3. A fluid exchange system for use in exchanging a used fluid with a fresh fluid in a vehicle having an automatic transmission and a fluid cooling circuit, said automatic transmission having an internal fluid pump to conduct a circulated fluid in the fluid cooling circuit, said fresh fluid being contained in and dispensed from a source external to said vehicle, said used fluid initially being contained within said vehicle and discharged into a receptacle external to said vehicle, said fluid exchange system comprising:

- a first fluid line intercoupled to the fluid exchange system and the fluid cooling circuit to conduct used fluid from the cooling circuit;
- a second fluid line intercoupled to the fluid exchange system, the source, and the fluid cooling circuit to conduct fresh fluid from the source into the fluid cooling circuit during an exchange procedure; and
- a movable component in fluid communication with both the used fluid from the cooling circuit and the fresh fluid from the source during the exchange procedure, said movable component being biased by used fluid to force fresh fluid into the vehicle at a rate which is substantially equivalent to the rate at which used fluid is being expelled from the vehicle.

4. The fluid exchange system of claim 3 wherein the movable component is a diaphragm element disposed within a fluid receiver.

5. The fluid exchange system of claim 3 further comprising:

- a plurality of quick connect couplers for connecting the fluid exchange system to vehicle.

* * * * *